(12) United States Patent
Waid

(10) Patent No.: US 6,288,170 B1
(45) Date of Patent: Sep. 11, 2001

(54) REMOVABLE ADHESIVE OF POLYEPOXIDE, CURING AGENT AND MICROSPHERES

(75) Inventor: Robert D. Waid, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/402,336

(22) PCT Filed: May 5, 1997

(86) PCT No.: PCT/US97/07505

§ 371 Date: Oct. 6, 1999

§ 102(e) Date: Oct. 6, 1999

(87) PCT Pub. No.: WO98/50480

PCT Pub. Date: Nov. 12, 1998

(51) Int. Cl.[7] .............. C08K 3/20; C08L 63/02; C08L 63/04; C08L 33/02
(52) U.S. Cl. .......... 525/113; 523/412; 525/109; 525/114; 525/118; 525/119
(58) Field of Search ............... 525/113, 109, 525/114, 118, 119; 523/412

(56) References Cited

U.S. PATENT DOCUMENTS

| | | |
|---|---|---|
| 2,951,825 | 9/1960 | Reinking et al. . |
| 3,691,140 | 9/1972 | Silver . |
| 3,765,972 | 10/1973 | Wesp .................................. 156/71 |
| 3,857,731 * | 12/1974 | Merrill, Jr. et al. ................. 526/307 |
| 4,049,483 | 9/1977 | Loder et al. .......................... 156/230 |
| 4,166,152 | 8/1979 | Baker et al. .......................... 428/522 |
| 4,503,211 | 3/1985 | Robins .................................. 528/92 |
| 4,556,591 | 12/1985 | Bannink, Jr. ............................ 428/43 |
| 4,636,432 | 1/1987 | Shibano et al. ....................... 428/327 |
| 4,707,534 | 11/1987 | Schultz .................................. 528/97 |
| 4,897,141 * | 1/1990 | Girard .................................. 523/444 |
| 4,968,562 | 11/1990 | Delgado ............................... 428/402 |
| 5,086,088 * | 2/1992 | Kitano et al. ......................... 522/100 |
| 5,128,412 * | 7/1992 | Miyasaka et al. .................... 525/108 |
| 5,234,757 | 8/1993 | Wong ................................ 428/311.1 |
| 5,397,611 | 3/1995 | Wong .................................. 428/35.7 |
| 5,464,902 | 11/1995 | Recker ................................. 525/119 |
| 5,540,963 | 7/1996 | Wong .................................. 428/35.7 |
| 5,660,901 | 8/1997 | Wong .................................. 428/35.7 |
| 5,783,272 | 7/1998 | Wong .................................. 428/35.7 |
| 5,883,193 * | 3/1999 | Karim .................................. 525/531 |

FOREIGN PATENT DOCUMENTS

| | | |
|---|---|---|
| 101 964 A1 | 3/1984 | (EP) . |
| 0 454 365 A2 | 10/1991 | (EP) . |
| 2 002 790 A | 2/1979 | (GB) . |
| WO-95/13328-A * | 5/1995 | (WO) . |

* cited by examiner

Primary Examiner—Robert E. L. Sellers
(74) Attorney, Agent, or Firm—Scott A. Bardell

(57) ABSTRACT

A thermosetting adhesive comprising a polyepoxide resin, a curing agent such as an imidazole and polymeric or elastomeric microspheres is removable when heated to a temperature greater than the use temperature of from about room temperature to about 185° C.

33 Claims, No Drawings

REMOVABLE ADHESIVE OF POLYEPOXIDE, CURING AGENT AND MICROSPHERES

BACKGROUND OF THE INVENTION

The invention relates to thermosettable adhesive compositions.

Thermosettable adhesive compositions have been used in a variety of applications where a semi-structural bond between two substrates is required. The semi-structural bond is necessary to ensure that the substrates are inseparable. In most applications, the bond is designed to be permanent. There are applications, however, in which it would be preferable for the adhesive composition to exhibit high performance bond properties during use (i.e., the period and environmental conditions, e.g., temperature range, over which the adhesive composition performs as a semi-structural adhesive), yet be removable after use. A tension exists between these opposing performance criteria. In the aerospace industry, for example, decorative sheets are often adhered to the interior walls of aircraft cabins using thermosettable adhesives. Over time the decorative sheets become marred (e.g., soiled, cut or torn) and styles change. It would be preferable if these decorative sheets could be removed and replaced with new sheets. Following cure, however, substrates bonded together by thermoset adhesive compositions are substantially inseparable. As a result, efforts to separate the substrates are often unsuccessful and result in substrate damage. In addition, the cured adhesive composition exhibits unpredictable cohesive and adhesive failure at either substrate.

A variety of thermosettable adhesive compositions are used to form semi-structural bonds to substrates. Thermosettable polyurethane adhesive compositions are often used to bond substrates together. Single package solvent-borne thermosettable polyurethane adhesive compositions rely on atmospheric moisture for curing. Water-borne thermosettable polyurethane adhesive compositions are cured by the addition of water dispersible isocyanate groups to the adhesive composition. The isocyanate groups react with the urea, amino-hydrogen and hydroxyl groups present in the water-borne prepolymer to crosslink the composition. U.S. Pat. No. 3,765,972 (Wesp) describes a pressure-sensitive adhesive composition for use wherever a strong permanent bond is desired. The adhesive composition includes a latex and a transient tackifier that includes an epoxy resin and a curing agent. The latex portion of the adhesive composition provides the film-forming capability of the composition.

U.S. Pat. No. 5,464,902 (Recker) describes incorporating minor quantities of functionalized, partially crosslinked, elastomeric particles having a glass transition temperature of less than 10° C. into epoxy resin systems to toughen the epoxy resin systems against impact-induced damage. The toughened matrix resin systems may be utilized as neat films in structural adhesives or may be scrim supported.

U.S Pat. No. 4,049,483 (Loder et al) describes a hot melt adhesive system of hot melt adhesive and inherently tacky elastomeric copolymer microspheres. The hot melt system has pressure sensitive adhesive characteristics at room temperature. The patent further describes adding a tackifying agent to the hot melt adhesive system to enhance the room temperature adhesion of the adhesive surface. Once the hot-melt adhesive system has been heat-activated, the adhesive is capable of forming a substantially permanent high strength hot melt bond. The basic properties of the hot melt matrix are unaffected by the inclusion therein of the microspherical adhesive.

SUMMARY OF THE INVENTION

In a first aspect, the invention features a thermosettable adhesive composition that includes a polyepoxide resin, a curing agent, and a plurality of microspheres. The microspheres, the polyepoxide resin, and the curing agent, and the relative amounts thereof, are selected such that upon cure (i.e., a sufficient degree of crosslinking to achieve a semi-structural bond to a substrate) the composition is capable of forming a semi-structural bond to a substrate and is cleanly thermally removable from the substrate. The adhesive composition can also include up to about 20% by weight flame retardant.

The cured adhesive compositions preferably exhibit a peel adhesion strength of at least 3.5 N/cm (2 pounds per inch width ("piw")), more preferably at least 10.5 N/cm (6 piw), when measured on an abraded phenolic resin impregnated fiberglass substrate or a polycarbonate substrate at room temperature (about 20° C. to 25° C.). In addition, preferred adhesive compositions exhibit no greater than about 35% retention (more preferably no greater than about 20% retention) of initial peel adhesion strength at a temperature greater than the upper use temperature. The adhesive compositions preferably exhibit a peel adhesion strength of at least 3.5 N/cm (2 piw) measured at room temperature and no greater than about 35% retention of initial peel adhesion strength at a temperature greater than the upper use temperature.

In one preferred embodiment, the cured composition exhibits no greater than about 35% retention of initial peel adhesion strength at a temperature greater than about 50° C., more preferably the composition exhibits no greater than about 35% retention of initial peel adhesion strength at a temperature of about 15° C. greater than the upper use temperature.

Preferred adhesive compositions have a ratio of weight of polyepoxide resin to weight of microspheres of between about 70:30 and about 35:65. The adhesive composition is preferably dispersed in water. The adhesive composition may be tacky or tack-free prior to cure.

The adhesive composition preferably cures at a temperature greater than room temperature, more preferably between about room temperature and about 200° C.

Preferred microspheres are characterized as having a surface that is essentially free of functional groups capable of reacting with the polyepoxide resin. The microspheres can be tacky or tack-free, solid or yhollow microspheres. Preferred microspheres include tacky, solid microspheres. The microspheres preferably have an average diameter between about 1 micrometer and about 20 micrometers. The microspheres preferably include the reaction product of isooctyl acrylate, acrylic acid and poly(ethylene oxide) acrylate.

The curing agents preferably include heat-activated curing agents or photolytically-activatedcuring agents. The curing agents can include a blend of an epoxy homopolymerization catalyst (e.g., tertiary amines, imidazoles, substituted derivatives of imidazoles and combinations thereof) and an addition curing agent (e.g., primary and secondary amines).

In another embodiment, the invention features an article that includes a substrate having a surface, at least a portion of which is provided with the above-described thermosettable adhesive composition. The substrate can be a rigid substrate or a flexible substrate, e.g., a film. The article may further include a second substrate in contact with the adhesive composition. The adhesive composition of the article, upon cure, preferably exhibits a peel adhesion of at least about 3.5 N/cm measured on the substrate at room temperature, and no greater than about 35% retention of initial peel adhesion strength at a temperature greater than the upper use temperature.

In another aspect, the invention features a method for making an article that includes providing the above-described adhesive composition on at least a portion of a substrate (e.g., a more rigid substrate). The method can further include contacting the adhesive composition with a second substrate (e.g., a more flexible substrate). The method preferably also includes curing the adhesive composition.

In one preferred embodiment, the invention features a method for making an adhesive article that includes contacting a surface with an article that includes the above-described thermosettable adhesive composition and heating the composition to a temperature sufficient to cure the composition. The method may further include contacting a substrate with the adhesive composition before heating the composition.

In other embodiments, the invention features a method for removing an article from a surface that includes heating an article having a cured thermosettable adhesive composition disposed between a first substrate and a second substrate and forming a semi-structural bond between the substrates, to a temperature greater than the use temperature of the composition, and cleanly removing the composition from one of the substrates.

In another aspect, the invention features a method for making a thermosettable adhesive composition cleanly thermally removable by incorporating a plurality of microspheres therein. The thermosettable adhesive composition, upon cure, is capable of forming a semi-structural bond to a substrate.

The invention provides adhesive compositions that are dispersed in water. As a result, they can be applied to surfaces as a water-based system as opposed to a solvent based system, which substantially reduces volatile organic compound emissions during application of the adhesive composition. The adhesive compositions are also relatively fast drying and stable to variations in temperature, pH, metal ion concentration, and shear force.

The adhesive compositions promote selective adhesive failure by allowing two surfaces to be inseparable at use temperature, yet readily separable upon heating such that a substantial portion of the adhesive composition will remain adhered to one of the two surfaces. This feature is particularly useful in decorative laminate applications because it allows for the simultaneous removal of substantially the entire decorative laminate and substantially all of the adhesive composition associated with the portion of the decorative laminate that is being removed.

Other advantages and features of the invention will be apparent from the detailed description and from the claims.

DESCRIPTION OF THE PREFERRED EMBODIMENTS

The thermosettable adhesive compositions include a polyepoxide resin, a curing agent for the polyepoxide resin, a plurality of microspheres, and optionally a flame retardant. The adhesive compositions, upon cure, yield thermoset adhesive compositions that are capable of forming a semi-structural bond between two substrates and, when heated to a temperature greater than the use temperature (i.e., the temperature or temperature range over which the adhesive composition performs as a semi-structural adhesive), exhibit selective adhesive failure, i.e., adhesive failure at one substrate, upon peel. The adhesive composition is preferably utilized in an article having a more flexible substrate bonded to a more rigid substrate. When such an article is heated to a temperature greater than the use temperature of the adhesive composition, the more flexible substrate can be peeled back and away from the more rigid substrate. As the substrates are peeled apart, adhesive failure occurs at one of the substrates, preferably the more rigid substrate. As a result, the cured adhesive composition can be simultaneously removed with one of the substrates, preferably the more flexible substrate.

Although preferred articles include a more flexible substrate and a more rigid substrate, the substrates generally can be made from any material suitable for the particular application envisioned for the substrate. Suitable materials for more flexible substrates include, e.g., polymeric film, metallic foil, paper, cloth, silk, woven fabrics, nonwoven fabrics, wood veneers, and leather. Appropriate materials for polymeric films include cellulose acetate film, ethyl cellulose film, polyolefins, polystyrene, polyvinyl alcohol, polyesters (e.g., polyethylene terephthalate and polybutylene terephthalate), poly(caprolactam), poly(vinyl fluoride), and the like.

Suitable materials for more rigid substrates include, e.g., those materials suitable for the more flexible substrate in a form that is more rigid than the more flexible substrate, (e.g., the rigid substrate would have a greater thickness than the thickness of the more flexible substrate), cellulosic materials (e.g., wood and wood products), metal, plastic, ceramic and the like.

The adhesive compositions are semi-structural adhesive compositions and may be structural adhesive compositions. Semi-structural adhesive compositions are thermosettable adhesive compositions that exhibit semi-structural bond strengths and heat resistance up to the upper use temperature of the adhesive compositions (i.e., the highest temperature at which the adhesive composition performs as a semi-structural adhesive) upon cure. Semi-structural bond strengths may exceed the breaking strength of one or both substrates joined by the adhesive composition. In addition, semi-structural adhesive compositions possess environmental resistance, e.g., resistance to humidity, heat aging, corrosion, and solvents. Semi-structural adhesive compositions are used to bond the non-load bearing parts of a product and are often used in the automobile and aerospace industries to bond, e.g., laminates such as vinyl foam to hard thermoplastics and interior trim constructions (e.g., fabric to fiber board and veneer to particle board).

The peel adhesion strength of an adhesive composition may vary depending upon the parameters of the system in which the adhesive composition is employed. These parameters include, for example, peel rate, angle of peel, temperature, humidity, and the nature and surface properties of the substrates that are bonded together by the adhesive composition. Peel adhesion strengths of systems that employ semi-structural adhesive compositions ultimately depend upon the application but are typified by room temperature peel adhesion values of at least 3.5 N/cm (2 piw), more preferably at least 10.5 N/cm (6 piw), most preferably at least 17.5 N/cm (10 piw), although these values could be higher. Measurement of peel adhesion strength is described below.

The polyepoxide resin, the curing agent and the microspheres and the amounts thereof are selected such that a majority of the cured adhesive composition is cleanly removable from a substrate upon heating to a temperature greater than the upper use temperature. Clean removability exists when at least a majority of the cured adhesive composition exhibits adhesive failure at a first of two substrates and a minor amount of the adhesive composition exhibits cohesive failure or adhesive failure at the second of the two substrates. The adhesive residue remaining on the second substrate is easily removable, e.g., by light rubbing with fingers, scraping with a fingernail, with a mild scouring pad and light hand pressure, liquid cleaners, and other like methods.

Removability is exemplified in the Examples set forth herein. Removability of the cured adhesive compositions may be expressed as percent retention of initial peel adhesion strength. The percent retention of initial peel adhesion strength is a ratio, expressed in percent, of 1) peel adhesion strength measured at a temperature other than room temperature according to a test procedure, and 2) peel adhesion strength measured at room temperature according to the same test procedure. The samples tested must have the same environmental history. Preferred adhesive compositions exhibit no greater than about 35% retention of initial peel adhesion strength, preferably no greater than about 25% retention of initial peel adhesion strength, more preferably no greater an about 20% retention of initial peel adhesion strength, and most preferably no greater than about 15% retention of initial peel adhesion strength when measured at a temperature greater than the use temperature.

The cured adhesive compositions preferably exhibit adhesive failure and are cleanly removable from a substrate when heated to a temperature greater than the upper use temperature of the adhesive composition, preferably at least about 50° C. greater than the upper use temperature, more preferably at least about 25° C. greater than the upper use temperature.

Preferred adhesive compositions have a ratio of weight of polyepoxide resin to weight of microspheres, on a dry weight basis, in the range of about 70:30 to about 35:65, more preferably in the range of about 65:35 to about 45:55, most preferably in the range of about 65:35 to about 55:45. Depending upon the application, the polyepoxide resins, curing agents for the polyepoxide resin, and microspheres and the relative amounts thereof can be selected so as to achieve adhesive compositions that, upon cure, exhibit semi-structural bond properties and clean thermal removability. The amount of microspheres, in particular, can be adjusted so as to provide adhesive compositions that, upon cure, have the properties set forth above.

The adhesive compositions will now be described in greater detail.

Polyepoxide Resin

Polyepoxide resins useful in the compositions of the invention are those compounds containing at least two 1,2-epoxide groups, i.e., groups having the following structure

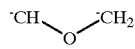

polymerizable by a ring opening reaction. Such materials, broadly called polyepoxides, include both monomeric and polymeric polyepoxides and can be aliphatic, cycloaliphatic, and aromatic and blends thereof. Aromatic polyepoxides are preferred because they can impart elevated temperature performance properties (e.g., high glass transition temperature and maintenance of peel adhesion strength at elevated temperatures) to the cured adhesive composition and can impart structural properties thereto. These materials generally have, on the average, a functionality of two to four, more preferably two to three, and most preferably about two. The polyepoxide resin preferably has a molecular weight of between about 250 and about 5000, more preferably between about 250 and about 2000, most preferably between about 500 and 1000, and an epoxide equivalent weight of about 60 to about 2500 grams per equivalent. The "epoxide equivalent weight" of a given compound is defined as the molecular weight divided by the number of epoxide groups in the compound.

Examples of suitable aromatic polyepoxide resins include polyglycidyl ethers of polyhydric phenols, eg., pyrocatechol, resorcinol, hydroquinone, 4,4'-dihydroxydiphenyl methane, 4,4'-dihydroxydiphenyldimethylmethane, 4,4'-dihydroxy-3,3'-dimethyldiphenylmethane, 4,4'-dihydroxydiphenylmethylmethane, 4,4'-dihydroxydiphenylcyclohexane, 4,4'-dihydroxy-3,3'dimethyldiphenyl dimethylmethane, 4,4'-dihydroxydiphenylsulfone, and tris-(4-hydroxyphenyl) methane);9,9-bis(4-hydroxyphenyl)fluorene and ortho-substituted analogs thereof such as disclosed in U.S. Pat. No. 4,707,534 (Schultz); polyglycidyl ethers of novolacs (i.e., reaction products of monohydric or polyhydric phenols with aldehydes, formaldehyde in particular, in the presence of acid catalysts); and the polyglycidyl ethers of halogenation (e.g., chlorination and bromination) products of the above-mentioned polyvalent phenols.

Other suitable polyepoxide resins include polyglycidyl derivatives of aromatic amines, i.e., glycidylamines, obtained from the reaction between aromatic amines and an epihalohydrin. Examples of suitable polyglycidyl aromatic amines include N,N'-diglycidyl aniline, N,N'-dimethyl-N,N'-diglycidyl-4,4'-diaminodiphenyl methane, N,N,N',N'-tetraglycidyl-4,4'-diaminodiphenyethane, N,N-diglycidylnaphthalenamine, N,N,N',N'-tetraglycidyl-1,4-bis [α-(4-aminophenyl)α-methylethyl]bnzene, and N,N,N',N'-tetraglycidyl-1,4-bis[α-(4-amino-3,5-dimethylphenyl)α-methylethyl]benzene. An example of a suitable polyglycidyl derivative of aromatic aminophenols is glycidylamino-glycidyloxybenzene, as disclosed in U.S. Pat. No. 2,951,825 (Reinking et al.). Other suitable polyepoxide resins include, e.g., polyglycidyl esters of aromatic polycarboxylic acids, e.g., diglycidyl esters of phthalic acid, isophthalic acid and terephthalic acid.

Preferred aromatic polyepoxide resins include polyglycidyl ethers of novolacs, diglycidyl ether of 4,4'-dihydroxy diphenyldimethyl methane and diglycidyl ether of 4,4'-dihydroxydipbenylmethane. Many suitable aromatic polyepoxide resins are available conmmercially including MY™-720 (from Ciba Specialty Chemicals Corporation, Brewster, N.Y.), ERL™-0510 (from Ciba Specialty Chemicals Corporation), the EPON™ series of materials from Shell Chemical Co., Houston, T.X. (e.g., EPON™ HPT-1071, EPON™ HPT-1072, EPON™ HPT-1079, and EPON™ 828), and the D.E.R.™, D.E.N.™ and QUA-TREX™ families of materials from Dow Chemical Company, Midland, Mich. (e.g., D.E.R™ 332, D.E.R.™ 661, D.E.N.™ 438, and QUATREX™ 1010).

Examples of suitable aliphatic polyepoxide resins include polyglycidyl ethers of aliphatic polyols, e.g., glycerol and hydrogenated 4,4'-dihydroxydiphenyl-dimethylmethane, and cycloaliphatic polyepoxide resins.

Minor amounts of monofunctional polyepoxide resins may also be used in combination with the polyepoxide resins to impart improved surface wetting characteristicsto the adhesive composition before cure and flexibility to the cured adhesive composition.

The polyepoxide resins are preferably in the form of an aqueous dispersions. Methods of preparing polyepoxide resin dispersions are known to the skilled artisan.

Examples of commercially available aqueous dispersions of aromatic polyepoxide resins that are suitable for use in the adhesive compositions of the invention include the EPI-REZ® series available under the trade designations WD-510,3520-WY-55,5522-WY-55,3522-WY-60,3540-WY-55, from Shell, ECN 1400, PY 323, PZ 3901, PZ 3907, PZ 3917, XU 3900, and XU 3903 (available under the trade designation ARALDITE from Ciba Specialty Chemicals Corporation).

Curing Agent

The term "curing agent" is used broadly to include not only those materials that are conventionally regardedas curing agents but also those materials that catalyze epoxy polymerization as well as those materials that may act as both curing agent and catalyst. Preferred curing agents for the polyepoxide resin include, e.g., room temperature curing agents, heat-activated curing agents and combinations thereof, and photolytically activated curing agents. Room temperature curing agents and heat-activated curing agents, can include, e.g., blends of epoxy homopolymerization catalyst type curing agents and addition type curing agents. The curing agents preferably react at temperatures of between about room temperature and about 200° C., more preferably about 30° C. and 150° C., most preferably between about 50° C. and about 115° C. Preferred curing agents are water soluble or water dispersible.

Examples of suitable curing agents include polybasic acids and their anhydrides, e.g., di-, tri- and higher carboxylic acids such as oxalic acid, phthalic acid, terephthalic acid, succinic acid, alkyl and alkenyl substituted succinic acids, tartaric acid, and anhydrides, e.g., phthalic anhydride, succinic anhydride, maleic anhydride, nadic anhydride and pyromellitic anhydride; polymerizable unsaturated acids, e.g., those containing at least 10 carbon atoms, e.g., dodecendioic acid, 10, 12-eicosadiendioic acid; and mercaptans.

Examples of other suitable curing agents include nitrogen containing compounds, e.g., benzyldimethylamine, benzylamine, N,N-diethyl aniline, melamine, pyridine, hydrazides, and aromatic polyamines, such as o-, m-, and p-phenylene diamine, 4,4'-diaminodiphenylsulfone, 3,3'-diaminodiphenylsulfone, and 4,4'diaminodiphenylsulfide, 4,4'-diaminodiphenylketone, 4,4'-diaminodiphenyl ether, 4,4'-diaminodiphenylmethane 1,3-propanediol-bis(4-aminobenzoate), fluorene-containingamines (e.g., 9,9-bis(4-aminophenyl)fluorene, 9,9-bis(3-methyl-4-aminophenyl) fluorene, 9,9-bis(3,5-dimethyl-4-methylaminophenyl) fluorene, 9,9-bis(3,5-dimethyl-4-aminophenyl)fluorene, 9,9-bis(3,5-diisopropyl-4-aminophenyl)fluorene, and 9,9-bis(3-chloro-4-aminophenyl)fluorene)1,4-bis[α-(4-aminophenyl) α-methylethyl]benzene, 1,4-bis[α-(4-amino-3,5-dimethylphenyl)-α-methylethyl]benzene, bis(4-amino-3-methylphenyl)sulfone, 1,1'-biphenyl-3,3'-dimethyl-4,4'-diamine, 1,1'-biphenyl-3,3'-dimethoxy-4,4'-diamine and diaminonaphthalenes.

Preferred curing agent include, e.g., aliphatic nitrogen-containing compounds, including poly(ether) amines, guanidines (e.g., dicyandiamide and tetramethyl guanidine), imidazoles (e.g., 2-ethyl-4-methylimidazole), cyclohexylamine, diethylenetriamine, triethylenetetraamine, cyclohexyldiamine, tetramethylpiperamine, N,N-dibutyl-1, 3-propanediamine, N,N-diethyl-1,3-propane diamine, 1,2-diamino-2-methyl-propane, 2,3-diamino-2-methylbutane, 2,3-diamino-2-methylpentane, and 2,4-diamino-2,6-dimethyloctane.

Examples of suitable phenolic curing agents include polyhydric phenols, e.g., pyrocatechol, resorcinol, hydroquinone, 4,4'-dihydroxydiphenylmethane, 4,4'-dihydroxydiphenyidimethylmethane, 4,4'-dihydroxy-3,3'-dimethyldipheny knethane, 4,4'-dihydroxydiphenylmethylmethane, 4,4'dihydroxydiphenylcyclohexane, 4,4'-dihydroxy-3,3'-dimethyldiphenyldimethylmethane, 4,4'-dihydroxydiphenylsulfone, and tris-(4-nydroxyphenyl) methane;and 9,9-bis(4-hydroxyphenyl)fluorene and ortho-substituted analogs thereof.

Other useful curing agents include chloro-, bromo-, and fluoro-containing Lewis acids of aluminum, boron, antimony, and titanium, such as aluminum trichloride, aluminum tribromide, boron trifluoride, antimony pentafluoride, titanium tetrafluoride, and the like. It is also desirable at times that these Lewis acids be blocked to increase the latency of adhesive compositions containing them. Representative of blocked Lewis acids are $BF_3$-monoethylamine, and the adducts of $HSbF_5X$, in which X is a halogen, —OH, or —$OR^1$ in which $R^1$ is the residue of an aliphatic or aromatic alcohol, aniline, or a derivative thereof, as described in U.S. Pat. No. 4,503,211.

Suitable photolytically activated curing agents include, e.g., iodonium and sulfonium salts of antimony and cobalt, and bis(arene) iron compounds.

Examples of commercially available curing agents suitable for use in the adhesive compositions include EPI-CURE™ 8535-W-50 and EPI-CURE™ 8537-WY-60 (available from Shell Chemical Co., Houston, Tex.), HY 955 (available from Ciba Specialty Chemicals Corporation), AMICURE™ CG-1400, ANCAMINE™ 2337S, CUREZOL® 2E4MZ, and CUREZOL® PHZ-S (available from Air Products, Pacific Anchor Chemical, Allentown, Pa.), and DCA-221 (available from Dixie Chemical Company, Pasadena, Tex.).

The curing agent is preferably present in an amount of about 2 to about 110 parts by weight, per 100 parts by weight of the polyepoxide resin. When the curing agent is a carboxylic acid, a guanidine, a phenol, an anhydride, or a primary or secondary amine, the curing agent preferably is present in about 0.5 to about 1.7 equivalents of acid, anhydride, or amine per equivalent of epoxide group. When the curing agent is an anhydride or a phenol, accelerators may be added in amounts of about 0.1 to about 5.0% based on the weight of polyepoxide resin. Accelerators may also be used alone and in the amounts noted. Examples of suitable accelerators include aromatic tertiary amines such as benzyldimethyl amine, and imidazoles such as 2-ethyl-4-methylimidazole. Lewis acid are preferably used in amounts of between about 0.1 and about 5% by weight based on the total weight of the polyepoxide resin.

Microspheres

The microspheres exist within the adhesive composition as a discontinuous phase and are characterized such that any functional groups present on the surface of the microspheres are incapable of reacting with or dissolving in the polyepoxide resin. It is well known that carboxylic acids and amines will react with polyepoxide resins. However, when such components are components of a microsphere and a hydrophilic macromer is also included as a component of the microsphere, a reaction can be avoided. Not wishing to be bound by theory, it is believed that the hydrophilic macromer located at the surface of the microsphere sterically shields the functional groups present on the surface and prevent them from reacting with the polyepoxide resin.

The microspheres are polymeric, elastomeric, solvent insoluble and solvent dispersible. In addition, they can be solid or hollow and tacky or tack-free. The specific type of microsphere can be selected to yield the desired properties of the adhesive composition for the particular application. Polymer microspheres preferably are formed by free radical suspension polymerization.

The microspheres generally will have an average diameter between about 1 micrometer ($\mu$m) and 250 $\mu$m, preferably between about 1 $\mu$m and 75 $\mu$m, more preferably between about 1 $\mu$m and 20 $\mu$m, and most preferably between about 1 $\mu$m and 10 $\mu$m. When the microspheres are hollow, the voids typically range in size from less than about 1 $\mu$m up to about 100 $\mu$m or larger.

For the formation of tacky microspheres preferred monomers include alkyl acrylates and methacrylates. These monomers are monofunctional unsaturated acrylate and methacrylate esters of non-tertiary alkyl alcohols. The alkyl groups of these alcohols preferably contain from 4 to 14 carbon atoms. These acrylate monomers are oleophilic, water emulsifiable, have restricted water solubility, and as homopolymers, generally have glass transition temperatures below about $-10°$ C. Examples of such monomers include, but are not limited to, isooctyl acrylate, 4-methyl-2-pentyl acrylate, 2-methylbutyl acrylate, isoamyl acrylate sec-butyl acrylate. n-butyl acrylate, 2-ethylhexyl acrylate, isodecyl methacrylate, isononyl acrylate, isodecyl acrylate, and mixtures thereof.

Preferred acrylate monomers include isooctyl acrylate, isononyl acrylate, isoamyl acrylate, isodecyl acrylate, 2-ethylhexyl acrylate, n-butyl acrylate, sec-butyl acrylate, and mixtures thereof Vinyl ester monomers suitable for use in the microparticles include, but are not limited to, vinyl 2-ethylhexanoate, vinyl caprate, vinyl laurate, vinyl perlargonate, vinyl hexanoate, vinyl propionate, vinyl decanoate, vinyl octanoate, and other monofunctional unsaturated vinyl esters of linear or branched carboxylic acids comprising 1 to 14 carbon atoms that, as homopolymers, have glass transition temperatures below about $-10°$ C. Preferred vinyl ester monomers include vinyl laurate, vinyl caprate, vinyl 2-ethylhexanoate, and mixtures thereof.

Acrylate or methacrylate or other vinyl monomers that, as homopolymers, have glass transition temperatures higher than about $-10°$ C. to $0°$ C., e.g., tert-butyl acrylate, isobornyl acrylate, butyl methacrylate, vinyl acetate, acrylonitrile, mixtures there of, and the like, may optionally be utilized in conjunction with one or more of the acrylate, methacrylate and vinyl ester monomers, provided the glass transition temperature of the resultant polymer is below about $-10°$ C.

For the production of elastomeric microspheres, other suitable co-monomers include polar co-monomers, e.g., monoolefinic monocarboxylic acids, monoolefinic dicarboxylic acids, acrylamides, N-substituted acrylamides, salts thereof, and mixtures thereof. Specific examples include acrylic acid, methacrylic acid, itaconic acid, crotonic acid, maleic acid, fumaric acid, sulfoethyl methacrylate, and ionic monomers such as sodium methacrylate, ammonium acrylate, sodium acrylate, trimethylaminep-vinyl benzamide, 4,4,9-trimethyl-4-azonia-7-oxo-8-oxa-dec-9-ene-1-sulphonate, N,N-dimethyl-N-(beta-methoxy-ethyl) ammonium propionate betaine, trimethylamine methacrylamide, 1,1-dimethyl-1-(2,3-dihydroxypropyl) amine methacrylamide, N-vinyl pyrrolidone, N-vinyl caprolactam, acrylamide, t-butyl acrylamide, dimethyl amino ethyl acrylamide, N-octyl acrylamide, mixtures thereof, and the like. Preferred polar monomers include monoolefinic monocarboxylic acids, monoolefinic dicarboxylic acids, acrylamides, N-substituted acrylamides, salts thereof and mixtures thereof. Examples of such monomers include but are not limited to acrylic acid, sodium acrylate, N-vinyl pyrrolidone, and mixtures thereof.

Optionally, free radically reactive hydrophilic macromers or polymers may be included and can be used as co-monomers to produce microspheres with pendent hydrophilic moieties. The hydrophilic components can act as crosslinkers when they are multi-functional. Preferred are free radically reactive hydrophilic oligomers (a polymer having a low number of repeating units, generally 2 to 20) and/or polymers including poly(alkylene oxides) (e.g., poly (ethylene oxide)), poly(vinyl methyl ether), cellulose derivatives and mixtures thereof.

Other suitable hydrophilic co-monomers include macromonomers, e.g., acrylate terminated poly(ethylene oxide), methacrylate terminated poly(ethylene oxide), methoxy poly(ethylene oxide) methacrylate, butoxy poly (ethylene oxide) methacrylate, p-vinyl benzyl terminated poly(ethylene oxide), acrylate terminated poly(ethylene glycol), methacrylate terminated poly(ethylene glycol), methoxy poly(ethylene glycol) methacrylate, butoxy poly (ethylene glycol) methacrylate, p-vinyl benzyl terminated poly(ethylene glycol), poly(ethylene oxide) diacrylate, poly (ethylene oxide) dimethacrylate, and mixtures thereof. These functionalized materials are preferred because they are easily prepared through well-known ionic polymerization techniques and are also highly effective in providing grafted hydrophilic segments along free radically polymerized microsphere polymer backbones.

The composition from which the elastomeric microspheres of the invention are made may also contain a multifunctional crosslinking agent. The term "multifunctional" as used herein refers to crosslinking agents that possess two or more free radically polymerizable ethylenically unsaturated groups. Useful multifunctional crosslinking agents include acrylic or methacrylic esters of diols such as butanediol diacrylate, triols such as glycerol, and tetraols such as pentaerythritol. Other useful crosslinking agents include polymeric multifunctional (meth)acrylates, e.g., poly(ethylene oxide) diacrylate or poly(ethylene) oxide dimethacrylate; polyvinylic crosslinking agents, such as substituted and unsubstituted divinylbenzene; and difunctional urethane acrylates, such as "EBECRYL" 270 and "EBECRYL" 230 (1500 weight average molecular weight and 5000 weight average molecular weight acrylated urethanes, respectively-both available from UCB Radcure, Inc., Smyrna, Ga.), and mixtures thereof.

When a crosslinker is employed, it is typically employed at a level of up to about 10 equivalent weight percent. Above about 0.15 equivalent weight percent, based on the total polymerizable microsphere composition, most elastomeric microspheres become tack-free. The "equivalent weight percent" of a given compound is defined as the number of equivalents of that compound divided by the total number of equivalents in the total (microsphere) composition, where an equivalent is the number of grams divided by the equivalent weight. The equivalent weight is defined as the molecular weight divided by the number of polymerizable groups in the monomer (in the case of those monomers with only one polymerizable group, equivalent weight=molecular weight). The crosslinker can be added at any time before 100% conversion to polymer of the monomers of the microsphere composition. Preferably, crosslinker is added before initiation occurs.

The elastomeric microspheres preferably comprise between about 45 and about 100 parts of at least one free radically polymerizable monomer, optionally up to about 15 parts of one or more polar monomers, and about 0 to about 40 parts of at least one hydrophilic component.

More preferably, the elastomeric microspheres comprise about 80 to about 100 parts, most preferably 90 to 100 parts, of one or more free radically polymerizable monomers selected from the group consisting of alkyl acrylate esters, alkyl methacrylate esters, vinyl esters, and mixtures thereof where the alkyl group is a $C_4$ to $C_{12}$ alky, optionally up to about 10 parts of at least one polar monomer, and optionally up to about 10 parts of a hydrophilic component. Most preferably the microspheres comprise about 95 to about 99 parts of the free radically polymerizable monomers, about 0.5 to about 5.0 parts of a hydrophilic component and, optionally about 0.1 to about 5.0 parts of a polar monomer.

The relative amounts of the components are important to the properties of the resultant microspheres and the adhesive composition as a whole.

If hollow, elastomeric microspheres are desired, they may be obtained via a "two-step" process comprising the steps of:

(a) forming a water-in-oil emulsion by mixing (1) an aqueous solution (which may contain some of the hydrophilic component and/or some of the optional polar monomer) with (2) oil phase base monomers, a free radical polymerization initiator, and internal crosslinking agent (if any is used);

(b) forming a water-in-oil-in-wateremulsion by dispersing the water-in-oil emulsion from step (a) into an aqueous phase (containing any of the hydrophilic component and/or polar monomer not added in step (a)); and (c) initiating suspension polymerization, usually by applying heat (preferably about 40 to 60° C., more preferably about 50 to 60° C.) or radiation (e.g., ultraviolet radiation).

Emulsifiers having a low hydrophilic-lipophilc balance (HLB) value are used to facilitate the formation (usually by agitation) of the water-in-oil emulsion in the first step. Suitable emulsifiersare those having an HLB value below about 7, preferably in the range of about 2 to 7. Examples of such emulsifiers include sorbitan monooleate, sorbitan trioleate, and ethoxylated oleyl alcohol such as Brij™ 93, available from Atlas Chemical Industries, Inc. A thickening agent, e.g., methyl cellulose, may also be included in the aqueous phase of the water-in-oil emulsion.

The aqueous phase into which the water-in-oil emulsion is dispersed in step (b) contains an emulsifier having an HLB value above about 7. Examples of such emulsifiers include ethoxylated sorbitan monooleate, ethoxylated lauryl alcohol, and alkyl sulfates. The emulsifier concentration (for both steps (a) and (b)) should be greater than its critical micelle concentration, which refers to the minimum concentration of emulsifier necessary for the formation of micelles, i.e., submicroscopic aggregations of emulsifier molecules. Critical micelle concentration is slightly different for each emulsifier, usable concentrations ranging from about $1.0 \times 10^{-4}$ to about 3.0 moles/liter. Additional detail concerning the preparation of water-in-oil-in-wateremulsions, i.e. multiple emulsions, may be found in various literature references, e.g., Surfactant Systems: Their Chemistry, Pharmacy, & Biology, (D. Attwood and A.T. Florence, Chapman & Hall Limited, New York, 1983).

Useful initiators are those which are normally suitable for free radical polymerization of acrylate or vinyl ester monomers and which are oil soluble and of very low solubility in water, typically less than 1 g/100 g water at 20° C. Examples of such initiators include azo compounds, hydroperoxides, peroxides, and the like, and photoinitiators such as benzophenone, benzoin ethyl ether, 2,2-dimethoxy-2-phenyl acetophenone. The initiator is generally used in an amount ranging from about 0.01% up to about 10% by weight of the total polymerizable composition, preferably up to about 5%.

Use of a substantially water soluble polymerization initiator, such as those generally used in emulsion polymerization, causes the formation of substantial amounts of latex. During suspension polymerization, any significant formation of latex is undesirable because of the extremely small particle size.

Hollow microspheres may also be prepared by a simpler "one-step" process comprising aqueous suspension polymerization of the hydrophilic component, the base monomer, and the polar monomer (which is not optional for this process) in the presence of an emulsifier which is capable of producing, inside the droplets, a water-in-oil emulsion that is substantially stable during both formation of the emulsion and subsequent suspension polymerization.

Useful emulsifiers are anionic materials having an HLB value greater than 25 and include alkylaryl ether sulfates such as sodium alkylaryl ether sulfate, e.g., Triton™ W/30, available from Rohm and Haas; alkylaryl poly(ether) sulfates such as alkylaryl poly(ethylene oxide) sulfates, preferably those having up to about 4 ethoxy repeat units; and alkyl sulfates, such as sodium lauryl sulfate, and sodium hexadecyl sulfate, triethanolamine lauryl sulfate, and sodium hexadecyl sulfate; alkyl poly(ether) sulfates, such as alkyl poly(ethylene oxide) sulfates, preferably those having up to about 4 ethoxy units. Alkyl sulfates, alkyl ether sulfates, alkylaryl ether sulfates, and mixtures thereof are preferred.

Non-ionic emulsifiers having an HLB value of between about 13 and 25 can be utilized in conjunction with the anionic emulsifiers. Examples of non-ionic emulsifiers include Siponic™ Y-500-70 (ethoxylated oleyl alcohol, available from Alcolac, Inc.), PLURONIC® P103, and Tween™ -40 (from ICI America). As in the two-step process, the emulsifier is utilized in a concentration greater than its critical micelle concentration. Polymeric stabilizers may also be present but are not necessary.

The above-described one-step method may be varied by combining the base monomer with non-ionic emulsifiers, oil soluble polymerization initiator, and any multifunctional internal crosslinker before the base monomer is added to the aqueous phase containing a hydrophilic component, emulsifier and any optional polar monomer. (The polar monomer is optional for this process.) The resulting emulsion is suspension polymerized to yield hollow microspheres. Anionic emulsifiers with an HLB value greater than 7 may be included in the aqueous phase to stabilize the system during suspension polymerization but are not required.

Solid microspheres may be prepared via the suspension polymerization methods disclosed in U.S. Pat. Nos. 3,691,140, 4,166,152, and 4,636,432. In general, these suspension polymerization techniques use ionic or non-ionic emulsifiers in an amount greater than the critical micelle concentration and/or protective colloids, finely divided inorganic solids, or the like.

Each suspension polymerization method (whether producing hollow or solid microspheres) may be modified by withholding the addition of all or some of the hydrophilic component and/or any optional polar monomer until after polymerization of the oil phase base monomer has been initiated. In this instance, however, these components must be added to the polymerizing mixture prior to 100% conversion of the base monomer. Similarly, the internal crosslinker (if used) can be added at any time before 100% conversion to polymer of the monomers of the microsphere composition. Preferably it is added before initiation occurs. The hydrophilic component can be added to the oil or water phase in the first step or the water phase in the second step, either before or after polymerization is initiated, or some combination of these options.

Following polymerization, an aqueous suspension of the hollow or solid microspheres is obtained which is stable to agglomeration or coagulation under room temperature conditions (i.e., about 20 to about 25° C.). The suspension may have a non-volatile solids content of from about 10 to about 60 percent by weight.

Other Additives

Other additives that can be blended into the thermosettable adhesive compositions to alter the characteristics of either the uncured or cured compositions include, but are not limited to, flame retardants, thickening agents, plasticizing agents, antioxidants, pigments, inorganic fillers such as silica and calcium carbonate, clays such as bentonite, reinforcing materials, such as hollow glass microspheres, glass beads, glass fibers, and polymeric fibers. These additives are preferably added in amounts of less than 10% by weight.

Flame retardants are useful for retarding the spread of fire and smoke emission. Preferred flame retardants are water soluble or water dispersible and resistant to hydrolysis. Examples of suitable flame retardants include melamine cyanurate, phosphate esters, phosphonate esters, melamine phosphates, ammonium phosphates, phosphazenes, red phosphorus and combinations thereof. Useful commercially available flame retardants include ANTIBLAZE® 19, ANTIBLAZE® 195, ANTIBLAZE® 1045, ANTIBLAZE® N, AMGARD® MC, AMGARD® NH and AMGARD® CHT (all available from Albright & Wilson Americas, Inc., Glen Allen, Va.). Flame retardants may be used in amounts of from 0 to about 20% by weight based on the total weight of the adhesive composition.

Thickening agents can be used to alter the viscosity characteristics of the adhesive compositions to achieve suitable application characteristics.

Plasticizing agents are useful for reducing the viscosity of the adhesive composition and improving the surface wetting characteristics of the adhesive composition during the curing process. Plasticizing agents are also useful for decreasing the temperature at which the cured adhesive compositions become thermally removable. Examples of suitable plasticizing agents include phosphate esters and phthalate esters.

Preparation of Adhesive Composition

The adhesive compositions are preferably prepared by blending a polyepoxide resin dispersion with the appropriate quantities of microsphere suspension and curing agent using methods known to those skilled in the art. The adhesive compositions may be provided in one part and two part compositions. That is, one part of the adhesive composition may include the curing agent without the polyepoxide resin while the second part of the adhesive composition may include the polyepoxide resin without the curing agent. The adhesive compositionsare dispersed in water and may be applied using a water-based system, e.g., a system that includes water and an optional cosolvent (e.g., alcohols).

The adhesive compositions may be coated onto a substrate using methods known in the art, including, e.g., brush coating, spray coating, knife coating, bar coating, dip coating and roll coating. The adhesive composition may then be dried and cured.

The adhesive compositions may cure using methods known in the art including, e.g., photolytic radiation, heat and combinations thereof: The adhesive compositions may cure at a single temperature, e.g., room temperature, or over a temperature range, preferably between about room temperature and about 200° C., more preferably between about 30° C. and about 150° C., most preferably between about 50° C. and about 115° C.

Suitable use temperatures for the cured adhesive compositions range from about room temperature to about 185° C., more preferably from about room temperature to about 135° C., most preferably from about room temperature to about 100° C.

The cured adhesive compositions preferably are cleanly removable at temperature greater than the upper use temperature of the adhesive composition, preferably at least about 50° C. above the upper use temperature, more preferably at least about 25° C. above the upper use temperature. In particular, the cured adhesive compositions are cleanly removable by heating the adhesive composition to a temperature greater than the use temperature. Preferred adhesive compositions are cleanly thermally removable at temperatures greater than about 40° C., more preferably greater than about 50° C., most preferably greater than about 70° C.

The invention will now be further described by way of the following examples.

General Preparation of Aqueous Adhesive Dispersions

Method A

An aqueous dispersion of polyepoxide resin, Epi-Rez® 3520-WY-55, was combined at room temperature with an aqueous suspension of microspheres, prepared previously as described above, in a glass jar with stirring by hand using a wooden tongue depressor until a uniform dispersion was obtained. This typically required about 1 to 3 minutes of mixing. A viscous liquid flame retardant additive, ANTIBLAZE® N, was warmed at 71° C. for about 30 minutes in a forced air oven to reduce viscosity and make it readily pourable. It was then added in a single portion to the aqueous dispersion of polyepoxide resin and microspheres and stirred, using an overhead electric motor equipped with a propeller blade, until the flame retardant was completely dissolved. This typically took about 5 minutes. Next, the curing agent(s) was added in a single portion and mixed by hand using a wooden tongue depressor until the curing agent(s) was fully dissolved, usually within 1 to 3 minutes. Finally, a viscous liquid thickening agent, Acrysol® SCT-275, was added, in portions, with mixing by hand using a wooden tongue depressor until it had dissolved and an increase in the viscosity of the composition was visibly observed. The resulting opaque, aqueous adhesive dispersion had a viscosity of about 100 to about 2200 centipoise.

Method B

A two part aqueous adhesive was prepared in the following manner. Part A was prepared by adding two curing agents, each in a single portion, to 20% by weight (based on the total amount present in the final adhesive composition once parts A and B are combined) of the aqueous microsphere suspension in an epoxy-lined, 0.95 liter steel can using an overhead air motor equipped with propeller blade, operating at about 200–600 rpm, until the curing agents were fully dissolved. This typically required about 15 minutes of mixing. Next, 20% by weight (based on the total amount present in the final adhesive composition once parts A and B are combined) of a viscous liquid thickening agent, Acrysol® SCT-275, was added in a single portion with mixing as before.

Part B was prepared by combining Epi-Rez® 3520-WY-55 with the remaining 80% by weight (based on the total amount present in the final adhesive composition once parts A and B are combined) of the aqueous microsphere suspension in an epoxy-lined, 3.8 liter steel can using the overhead air motor under the conditions described for Part A until a uniform dispersion was obtained. This typically required about 15 minutes of mixing. A viscous liquid flame retardant additive, ANTIBLAZE® N, was warmed at 71° C. for about 30 minutes in a forced air oven to reduce viscosity and make it readily pourable. It was then added in a single portion to the aqueous dispersion of polyepoxide resin and microspheres and stirred, using the previously described overhead air motor, until the flame retardant was completely dissolved. This generally took about 15 minutes. Finally, the remaining 80% by weight (based on the total amount present in the final adhesive composition once parts A and B are combined) of the Acrysol® SCT-275 thickening agent was added in a single portion with mixing as before.

The two parts were kept separate until just prior to use. Upon combination the resulting opaque, aqueous adhesive dispersion had a viscosity of about 100 to about 1000 centipoise as measured using a Brookfield viscometer.

General Preparation of Laminates

Method A

A rigid substrate was coated with the aqueous adhesive dispersion using a No. 26 Meyer Rod to give a wet film thickness of about 0.152 to about 0.178 millimeters (measured). The rigid substrate employed was either 1) a piece of polycarbonate (available under the trade designation Lexan®, from General Electric Co., Schenectady, N.Y.) having a length of about 10.2 centimeters, a width of about 5.1 centimeters, and a thickness of about 0.32 centimeters, which was used as received after removing the protective paper cover; or 2) a 12.7 (length)×5.1 (width)×0.76 (thickness) centimeter core of a phenolic/fiberglass honeycomb (available under the trade designation Nomex® from DuPont Fibers, Wilmington, Del.) having a 0.51 millimeter thick faceskin of phenolic resin impregnated fiberglass on each major surface. When the honeycomb substrate was used, the faceskin surface was wiped clean with methyl ethyl ketone prior to coating with an aqueous adhesive dispersion.

One end of the substrate was covered with a 1.25 centimeter wide piece of masking tape to provide a tab end for peel adhesion testing. The substrate was held down by placing strips of masking tape along the lengthwise edges of the substrate such that between about 0.32 and 0.64 centimeters of the edge was covered. The remaining exposed surface area, having a length of 11.4 centimeters and a width of between about 3.8 and 4.5 centimeters, was then coated with the aqueous adhesive dispersion and dried in air at room temperature until no adhesive was transferred upon applying slight thumb pressure, typically about 20 to about 40 minutes. The dried coating had a slightly hazy appearance and was essentially nontacky to the touch.

A strip of a multilayer decorative laminate film, having a length of 17.8 centimeters, a width of 2.5 centimeters and a total thickness of 0.28 millimeters, was placed on the coated surface of the rigid substrate such that one end extended between about 3.8 and 5.1 centimeters beyond one end of the coated substrate. The multilayer decorative laminate film was obtained from the Boeing Company (Seattle, Wash.), and is described in the Boeing document BMS 5-127E, Section 8.4.1.1.1(Revised Jun. 24, 1994). Briefly, the multilayer decorative laminate film included two layers of poly(vinyl fluoride) film (available under the trade designation TEDLAR® PVF Film from Dupont Company, Wilmington, Del.) laminated to one major surface of a texture retention material. The opposite major surface of the texture retention material was bonded to the rigid substrate by use of the adhesive composition. A 2.5×10.2 centimeter silicone rubber heating blanket having embedded therein heating elements connected to, and controlled by, a Watlow Model 985 programmable heater (commercially available from Watlow Controls, Winona, Minn.) was placed over an aluminum plate having the same length and width and a thickness of 0.10 centimeters. Poly(tetrafluoroethylene) tape was wrapped around both the aluminum plate and silicone blanket to hold them together, and a thermocouple was inserted between the aluminum plate and heating blanket. This taped combination was positioned on top of the multilayer decorative laminate film such that it covered the width of the decorative laminate film and abutted the taped tab. After clamping the entire assembly together using 3 one inch metal clips it was heated from room temperature to 113° C. over a period of about 2 minutes and held at that temperature for 8 minutes to cure the adhesive composition. The clips then were removed, the assembly taken apart, and the bonded structure of rigid substrate and multilayer decorative laminate film was allowed to cool to room temperature.

Method B

A core of Nomex® honeycomb covered with faceskins as described for Method A above, and having a length and width of 30.5 centimeters each, was abraded on one of the faceskin surfaces using methyl ethyl ketone and a 3M Heavy Duty Scotch-Brite™ Scouring Pad (commercially available from 3M Company, St. Paul, Minn.) until the surface no longer exhibited a glossy appearance.

Just prior to application, parts A and B of the aqueous adhesive dispersion, prepared as described in "General Preparation of Aqueous Adhesive Dispersions—Method B", were combined and mixed using an overhead air motor as described therein until a uniform dispersion was obtained, generally between about 10 and 15 minutes. Next, the aqueous adhesive dispersion of the invention was filtered through a No. 64 mesh cone strainer filter (commercially available from Tufco Industries, Inc., Green Bay, Wis.) before spraying it, at various concentrations, onto the abraded faceskin surface of the rigid substrate. Spraying was done using a DeVILBISS Model JGHV-530 spraygun (commercially available from DeVILBISS Ransberg Co., Maumee, Ohio) equipped with a #33A air cap. The air line pressure was 40 pounds/inch$^2$, which resulted in a pressure of 4 pounds/inch$^2$ at the exit orifice of the air cap. The spray tip was held about 23+/−7.6 centimeters from the rigid substrate surface during spraying. The sprayed substrate was dried in air at room temperature until the adhesive coating appeared clear, typically about 15 minutes. The dried coating was very slightly tacky to the touch.

A strip of 3M™ 471 Vinyl Tape, having a width of 5.1 centimeters, was placed along the entire length of two opposing edges of the adhesive coated faceskin surface so as to leave an exposed faceskin area of 30.5 by 20.3 centimeters. This provided unbonded tab ends which could be used in the evaluation of peel adhesion strength. The entire coated/taped surface of the rigid substrate was then covered with a piece of a multilayer decorative laminate film, having a length and width of 30.5 centimeters. The multilayer decorative laminate film was obtained from the Boeing Company (Seattle, Wash.) and was as described above. This assembly was placed in a custom made (Greco Manufacturing, Buchanan, Mich.), scaled down version of a commercially available laminator (Model 3X4-230-1-60, Greco Manufacturing, Buchanan, Mich.) equipped with a silicone rubber blanket, heat and vacuum sources, and having the dimensions of 94.0 by 81.3 centimeters. The custom made laminator employed radiant bar elements for heating instead of quartz halogen lamps as used in the commercial laminator. A vacuum of 635 millimeters Hg was pulled and then heating from about 22° C. to 113° C. begun at a rate of between 5.5 and 8.3° C./minute. After reaching 113° C. the assembly was held at that temperature for 8 minutes to substantially cure the adhesive composition, then allowed to cool to about 71° C. before releasing the vacuum and removing the cured assembly. Bars measuring 2.5 by 30.5 centimeters were cut perpendicular to the taped direction so as to provide two unbonded tab ends on each bar, with a bonded length of 20.3 centimeters centered between the tabs. After aging at various conditions the bars were cut to provide two specimens each having a length of 7.6 centimeters including a 5.1 centimeter taped tab end. Each specimen was further treated in the following manner. The vinyl tape was removed and the underlying faceskin layer, opposite the adhesive coated faceskin layer, and honeycomb core were cut away. The specimen thus obtained had a 5.1 centimeter long tab of faceskin and a 7.6 centimeter long section of decorative laminate film, 2.5 centimeters of said decorative laminate film being bonded to the remaining faceskin covered honeycomb core and 5.1 centimeters being unbonded.

Test Methods

Evaluation of Drying Time

Drying time was evaluated using thermogravimetric analysis (TGA) to measure the amount of remaining solvent after a prescribed drying protocol. More specifically, about 20 milligrams of an aqueous blend of a polyepoxide resin and either microspheres, or an analogous acrylic latex, was placed in a Seiko Model SSC/5200 Thermogravimetric/Differential Thermal Analyzer (Seiko Instruments USA, Inc. Torrance, Calf.) and dried according to the following method. Beginning at 25° C., the sample was heated to 90° C. at 65° C./minute, held at 90° C. for 45 minutes, heated at 30° C./minute to 120° C., and held at 120° C. for 20 minutes. Throughout the experiment the test chamber was purged with air at 400 milliliters/minute. The weight loss was monitored from the beginning to the end of the experiment. The results were normalized to 100% dryness, i.e., the constant weight obtained at the end of the 120° C. stage. Results are reported through the end of the 90° C. isotherm stage.

Evaluation of Effect of Microsphere Reactivity

The interaction of reactive groups on the microsphere with polyepoxide resins was evaluated by differential scanning calorimetry. More specifically, about 20 milligrams of a dried adhesive film was placed in a Seiko Model SSC/5200 Differential Scanning Calorimeter (Seiko Instruments USA, Inc.) and heated from 25° C. to 240° C. at a rate of 20° C./minute under a nitrogen purge (30 millimeters/minute). The heat of reaction (i.e., exotherm) was plotted versus temperature.

Evaluation of Peel Adhesion Strength

Method A

The cured structure having a multilayer decorative laminate film bonded to a rigid substrate was evaluated for peel adhesion strength by taking the tab end of the decorative laminate film between thumb and side of forefinger and peeling it back away from the rigid substrate at an angle of 180° and a rate of about 152 centimeters/minute. Two specimens were tested for each example. A grade of "Yes" was assigned to those specimens where there occurred tensile failure of the multilayer decorative laminate film, i.e., the decorative laminate film itself tore. This result indicated that the bond strength of the adhesive composition to both the rigid substrate and the decorative laminate film was greater than the tensile strength of the decorative laminate film. A grade of "No" was assigned to those examples where failure occurred at either the adhesive/rigid substrate or the adhesive/decorative laminate film interface. Such results indicated that the tensile strength of the decorative laminate film was greater than the bond strength of either the adhesive to the rigid substrate or the bond strength of the adhesive to the decorative laminate film.

Method B

The cured structure having a multilayer decorative laminate film bonded to a rigid substrate was evaluated for 180 degree angle peel adhesion characteristics using the test method described in ASTM D 903 with the following modifications. Two specimens, each measuring 2.5 centimeters by 7.6 centimeters (including a 5.1 centimeter faceskin tab at one end), were peeled at a rate of 5.1 centimeters/minute. For each specimen the average peel strength was determined over a peel length of 2.5 centimeters. The values reported are an average of two specimens. A SINTECH Model 10 Mechanical Tester (commercially available from SINTECH, Inc., Stoughton, Mass.) fitted with a 90.7 kilogram load cell was used. The specimens were mounted such that the 5.1 centimeter long faceskin tab was held by a bottom static grip and 2.5 centimeters of the decorative laminate film tab was held by a top dynamic grip. The mechanical-tester employed Testworks software, Version 1.2, to analyze the data and provide results. Peel adhesion strength was measured after various aging conditions, and is reported in Newtons/centimeter. (Peel adhesion strengths were measured in units of pounds/inch width and converted into units of Newtons/centimeters by multiplying by 1.751). Preferably the multilayer decorative laminate film component tore rather than peeled away. In these cases the peel value at failure is reported.

Evaluation of Thermal Removability

Method A

The cured structure having a multilayer decorative laminate film bonded to a rigid substrate was evaluated for thermal removability in the following manner. A sample, measuring 2.5 centimeters by 10.2 centimeters, was first equilibrated at a temperature of 121° C. for between about 30 and about 60 minutes in a forced air oven, then removed, and (while still hot) the tab end of the decorative laminate film was taken between thumb and side of forefinger and peeled back away from the rigid substrate at an angle of 180° and a rate of about 152 centimeters/minute. A grade of "Yes" was assigned to those examples where the cured adhesive and decorative laminate film were removed cleanly, or left only a minimum amount of adhesive residue on the rigid substrate. Any minimum residue remaining on the rigid substrate was easily removed by scraping while still warm. A grade of "No" was assigned to those examples where the cured adhesive and decorative laminate film tore or left a significant amount of adhesive residue on the rigid substrate that could not be easily removed by scraping while still warm.

Method B

The peel adhesion value of two test specimens, prepared as described in "General Preparation of Laminates—Method B", was measured in a heated test chamber using the procedure described in "Evaluation of Peel Adhesion Strength—Method B" above. The specimens were equilibrated at 121° C. for 5 minutes before testing.

Glossary

Various abbreviations are used in the following examples. The abbreviations are defined as follows:

| | |
|---|---|
| AA | acrylic acid |
| ACRYSOL ® SCT-275 | a nonionic, hydrophobic polyethylene oxide urethane, 17.5% solids in water:butyl carbitol/ 75:25 (w/w), commercially available from Rohm & Haas Company, Philadelphia, PA. |
| ANTIBLAZE ® N | a water soluble, cyclic phosphonate ester; commercially available from Albright & Wilson Americas, Inc., Glen Allen, VA. |
| CUREZOL ® 2E4MZ | 2-ethyl-4-methyl imidazole, commercially available from Air Products and Chemicals, Allentown, PA. |
| CUREZOL ® 2PHZ-S | finely ground 2-phenyl-4,5-dihydroxymethyl imidazole, commercially available from Air Products and Chemicals, Allentown, PA. |
| DCA-221 | 4,7,10-trioxadecane-1,13-diamine, commercially available from Dixie Chemical Company, Pasadena, TX. |
| Imidazole | commercially available from Aldrich Chemical Company, Inc., Milwaukee, WI. |
| Epi-Rez ® 3520-WY-55 | an aqueous dispersion of diglycidyl ether of bisphenol A, 53.5% solids, having an average epoxide equivalent weight of 535, available from Shell Chemical Company, Houston, TX. |
| Epi-Rez ® WD 510 | a water dispersible liquid diglycidyl ether of bisphenol A, 100% solids, having an average epoxide equivalent weight of 200, available from Shell Chemical Company, Houston, TX. |
| Epi-Rez ® 5522-WY-55 | an aqueous dispersion of diglycidyl ether of bisphenol A, 55% solids, having an average epoxide equivalent weight of 625, available from Shell Chemical Company, Houston, TX. |
| IOA | isooctyl acrylate |
| NCI 549802 | 4,7,10-trioxatridecane-1,13-diamine, commercially available from BASF Corporation, Mount Olive, N.J. |
| PEOA | poly(ethylene oxide) monoacrylate, average molecular weight of 750. |

Unless noted otherwise, in the following examples all amounts are given in grams rounded to the nearest hundreth.

Preparation of Microspheres

An aqueous suspension of solid microspheres was prepared for use in the adhesive composition. More specifically, 4.8 grams of acrylic acid (AA), 2.4 grams of poly(ethylene oxide) monoacrylate (PEOA), and 1.13 grams Lucidol™ 70 (70% benzoyl peroxide, commercially available from Elf Atochem North America, Inc., Philadelphia, Pa.) were dissolved in 232 grams isooctyl acrylate (IOA). Next, 0.75 grams of Siponate™ DS-10 (sodium dodecyl benzene sulfonate surfactant, commercially available from Rhone-Poulenc, Inc., Cranbury, N.J.) was dissolved in 360 grams of water. The isooctyl acrylate mixture was then added to the surfactant solution and emulsified using an Omni™ Mixer homogenizer until the droplet size was less than 5 micrometers. Typically this took about 10 minutes or less. The suspension was then charged into a 1 liter baffled reactor, degassed with nitrogen, heated to 65° C., reacted at this temperature for 8 hours before allowing to cool to room temperature. The final suspension (40% solids) contained polymeric, elastomeric, solvent insoluble but solvent dispersible microspheres that were substantially nonreactive and that had a composition of IOA:AA:PEOA/97:2:1 (w/w/w). This suspension of microspheres was used in the following examples.

Compositions 1–6

A series of aqueous adhesive dispersions was prepared as described above in "General Preparation of Aqueous Dispersions of Adhesive Compositions—Method A" with the following exceptions. No flame retardant was employed in Compositions 1 or 2; in Compositions 1 and 3 the curative was dispersed not dissolved; and in Composition 6 a mixture of polyepoxide dispersions were employed as indicated. The components and amounts are set forth in Table 1 below.

Comparative Composition 1

Comparative Composition 1 was formulated using a latex emulsion in place of the microsphere suspension. The latex component had the same composition as the microsphere component (IOA:AA:PEOA/97:2:1 (w/w/w)) which was described in "Preparation of Microspheres". More specifically, 750 grams of deionized water, 0.25 grams of sodium bicarbonate, and 8.0 grams of Siponate™ DS-10 were added to a 2 liter glass reaction vesse, a purge of nitrogen gas begun and the mixture heated, using two 250 Watt infrared heat lamps, to 35° C. with stirring at about 50 revolutions/minute (rpm) to dissolve the Siponate™ DS-10. This typically took about 10 minutes. In a plastic beaker were mixed 242.5 grains of IOA, 5.0 grams of AA and 2.5 grams of PEOA to give a slightly hazy solution. Next, the stirring rate in the glass flask was increased to about 200 rpm and the solution was added rapidly in a single portion, all while maintaining a nitrogen purge. After mixing between about 2 to 5 minutes, 1.0 gram of a 0.2% (w:w) aqueous solution of ferric sulfate heptahydrate and 0.8 grams of potassium persulfate solid were added while continuing to stir with a nitrogen purge. After about 8 to about 12 minutes an exotherm occurred resulting in a temperature increase to approximately 45° C. over a period of about 32 minutes. The mixture was then heated with infrared heat lamps to a temperature of 60° C. and held there for 3 hours followed by cooling to between about 32° C. and 40° C. using a cold water bath while stirring to give a 25.7% solids latex emulsion having a composition of IOA:AA:PEOA/97:2:1 (w/w/w). This latex emulsion was then concentrated down to 43.4% solids by evaporation of some of the water using a hot plate with stirring.

This latex emulsion was used to prepare an aqueous adhesive composition as described above in "General Preparation of Aqueous Dispersions of Adhesive Compositions—Method A" but with the exception that the latex emulsion was used in place of the microsphere suspension. The components and amounts are set forth in Table 1 below.

TABLE 1

| Epoxide | Microsphere | Thickener | Epoxide:Acrylic Dry |
|---|---|---|---|

| C* | Dispersion (grams) | Suspension (grams) | Curing Agent I.D. (grams) | Solution (grams) | Flame Retardant (grams) | % Solids | Ratio (wt.:wt.) |
|---|---|---|---|---|---|---|---|
| 1 | 8.00 | 16.00 | CUREZOL® 2PHZ 0.40 | 1.00 | 1.60 | 48.0 | 41:59 |
| 2 | 10.00 | 16.00 | Imidazole 0.20 | 1.00 | 2.50 | 49.7 | 46:54 |
| 3 | 8.00 | 8.00 | CUREZOL® 2PHZ 0.40 | 1.00 | 1.20 | 50.4 | 58:42 |
| 4 | 8.00 | 8.00 | CUREZOL® 2E4MZ + DCA-221 0.20 + 0.20 | 0.50 | 0.55 | 49.5 | 58:42 |
| 5 | 8.00 | 8.00 | CUREZOL® 2E4MZ 0.25 | 1.00 | 0 | 46.5 | 58:42 |
| 6 | 6.00 ± 2.00[1] | 8.00 | CUREZOL® 2E4MZ + DCA-221 0.20 + 0.20 | 0.50 | 0 | 53.2 | 62:38 |
| CC | 21.70 | 20.00[2] | CUREZOL® 2E4MZ + DCA-221 0.54 + 0.54 | 0.63 | 1.36 | 51.7 | 58:42 |

C* = Composition.
CC = Comparative Composition.
1) a mixture of Epi-Rez® 3520-WY-55 dispersion and Epi-Rez® WD510 liquid/6:2 (w:w).
2) 43.4% solids latex emulsion, not microsphere suspension.

EXAMPLES 1–9 AND COMPARATIVE EXAMPLE 1

The compositions described in Table 1 were used to coat a surface of either a rigid polycarbonate substrate (PC) or a faceskin covered honeycomb core (FS), then dried and laminated to a 0.28 millimeter thick multilayer decorative laminate film as described in "General Preparation of Laminates—Method A". The cured samples were evaluated for peel adhesion strength as given in "Evaluation of Peel Adhesion Strength—Method A" under two different conditions: 1) immediately after curing and cooling to room temperature (23° C.), and 2) immediately after equilibrating for 60 minutes at 71° C. in a forced air oven (the samples were removed and tested while still hot). Thermal removability was also determined as described in "Evaluation of Thermal Removability—Method A" above. The results are shown in Table 2 below.

TABLE 2

| Ex. No. | Surface | Composition | Epoxide: Acrylic Dry Ratio (wt:wt) | Peel Adhesion Strength (Tearing of Decorative Laminate Film?) @ 23° C. | @ 71° C. | Thermally Removable @ 121° C.? |
|---|---|---|---|---|---|---|
| 1 | PC | 1 | 41:59 | Yes | N.T. | Yes |
| 2 | PC | 2 | 46:54 | Yes | N.T. | Yes |
| 3 | PC | 3 | 58:42 | Yes | No | Yes |
| 4 | PC | 4 | 58:42 | Yes | N.T. | Yes |
| 5 | PC | 5 | 58:42 | Yes | Yes | Yes |
| 6 | PC | 6 | 62:38 | Yes | N.T. | Yes |
| 7 | FS | 4 | 58:42 | Yes | Yes | Yes |
| 8 | FS | 5 | 58:42 | Yes | N.T. | No |
| 9 | FS | 6 | 62:38 | Yes | N.T. | No |
| CE-1 | FS | CC | 58:42 | No | No | No |

N.T. = Not Tested

Compositions 7 and 8

Two aqueous adhesive dispersions of the invention were prepared as described above in "General Preparation of Aqueous Dispersions of Adhesive Compositions—Method B". The components and amounts are set forth in Table 3

TABLE 3

| C* | Epoxide Dispersion (grams) | Microsphere Suspension (grams) | Curing Agent I.D. (grams) | Thickener Solution (grams) | Flame Retardant (grams) | % Solids | Epoxide: Acrylic Dry Ratio (wt.:wt.) |
|---|---|---|---|---|---|---|---|
| 7 | 537.0 | 537.0 | CUREZOL ® 2E4MZ + DCA-221 13.4 + 13.4 | 14.9 | 33.5 | 49.9 | 58:42 |
| 8 | 2153.4 | 1739.6 | CUREZOL ® 2E4MZ + DCA-221 53.7 + 53.7 | 68.0 | 134.8 | 50.8 | 64:36 |

C* Composition.

EXAMPLE 10 AND COMPARATIVE EXAMPLE 2

Composition 7 described in Table 3 was coated onto a surface of a faceskin covered honeycomb core which was then dried and laminated to a 0.28 millimeter thick multilayer decorative laminate film as described in "General Preparation of Laminates—Method A". The resulting cured laminate was evaluated for peel adhesion strength and thermal removability as given for Examples 1–6 above. The results, along with those from Comparative Example 2, are shown in Table 4.

TABLE 4

| Ex. No. | Composition | Epoxide: Acrylic Dry Ratio (wt.:wt.) | Peel Adhesion Strength (Tearing of Decorative Laminate Film?) @ 23 C. | @ 71 C. | Thermally Removable @ 121 C.? |
|---|---|---|---|---|---|
| 10 | 7 | 58:42 | Yes | Yes | Yes |
| CE-2 | cc | 58:42 | No | No | No |

EXAMPLES 11 AND 12

Examples 11 and 12 were prepared by spraying Compositions 7 and 8 onto a surface of a faceskin covered honeycomb core, at a coating level of 37.7 grams/meter², which was then dried and laminated to a 0.28 millimeter thick multilayer decorative laminate film as described in "General Preparation of Laminates—Method B". The resulting cured laminates were evaluated immediately after preparation (0 days) and after standing for 7 days at room temperature, for peel adhesion strength at room temperature (24° C.) and thermal removability according to "Evaluation of Peel Adhesion Strength—Method B" and "Evaluation of Thermal Removability Method B". The results are shown in Table 5.

TABLE 5

| Ex. No. | Composition | Peel Adhesion Strength (N/cm) | | Thermal Removability (N/cm) | |
|---|---|---|---|---|---|
| | | @ 24 C. (Aged 0 Days) | @ 24 C. (Aged 7 Days) | @ 121 C. (Aged 0 Days) | @ 121 C. (Aged 7 Days) |
| 11 | 7 | 4.4 | 7.9 | 0.3 | 0.7 |
| 12 | 8 | 7.2 | 8.9 | 1.0 | 1.6 |

The results in Table 5 show that a peel adhesion strength of at least 4.4 Newtons/centimeter is provided by the adhesive compositions. In addition, upon heating to 121° C. the decorative laminate films and adhesive were cleanly removable, exhibiting peel adhesion values of 1.6 Newtons/centimeter or less. For all specimens evaluated, an adhesive failure mode was observed with the adhesive layer remaining on the decorative laminate film.

EXAMPLES 13 AND 14

Examples 13 and 14 were prepared in the same manner described for Examples 11 and 12 respectively. The resulting cured laminates were evaluated immediately after preparation (0 days) for peel adhesion strength at room temperature (24° C.) and thermal removability. In addition, the cured laminates were aged at 71° C. for 7 days in a forced air oven, cooled to room temperature, then evaluated for peel adhesion strength (at both 24° C. and 71° C.) and thermal removability. Testing was done as described for Examples 11 and 12. For peel adhesion at 71° C. the equilibration time at temperature was 5 minutes. The results are shown in Table 6.

TABLE 6

| Ex. No. | Composition | Peel Adhesion Strength (N/cm) | | | Thermal Removability (N/cm) @ 121 C. | |
|---|---|---|---|---|---|---|
| | | @ 24 C. (Aged 0 Days) | @ 24 C. (Aged 7 Days) | @ 71 C. (Aged 7 Days) | (Aged 0 Days) | (Aged 7 Days) |
| 13 | 7 | 4.4 | 17.5* | 13.3** | 0.3 | 3.0 |
| 14 | 8 | 7.2 | 20.1* | 15.0* | 1.0 | 3.1 |

*decorative laminate film tore; peel value is that at failure.
**0.3 centimeter edges did not peel; peel values were calculated using 1.9 centimeter width.

The results in Table 6 show that a peel adhesion strength of at least 4.4 Newtons/centimeter is provided by the adhesive compositions, and that upon aging at 71° C. the peel adhesion strength was generally greater than the strength of the decorative laminate film as evidenced by tearing of the decorative laminate film. In addition, when heated to 121° C. the decorative laminate films and adhesive were cleanly removable, exhibiting peel adhesion values of 3.1 Newtons/ centimeter or less. For those specimens in which the decorative laminate film did not tear, an adhesive failure mode was observed with the adhesive layer remaining on the decorative laminate film.

EXAMPLES 15 AND 16

Examples 15 and 16 were prepared in the same manner described for Examples 11 and 12 respectively. The resulting cured laminates were aged at 49° C. and 95% (+/−5%) relative humidity for 7 days and cooled to room temperature. Specimens were evaluated immediately after preparation (0 days) for peel adhesion strength at room temperature (24° C.) and thermal removability. They were also evaluated after aging for peel adhesion strength at both 24° C. and 71° C., and thermal removability. Testing was done as described for Examples 11 and 12. For peel adhesion at 71° C. the equilibration time at temperature was 5 minutes. The results are shown in Table 7.

TABLE 7

| Ex. No. | Composition | Peel Adhesion Strength (N/cm) | | | Thermal Removability | |
|---|---|---|---|---|---|---|
| | | @ 24 C. (Aged 0 Days) | @ 24 C. (Aged 7 Days) | @ 71 C. (Aged 7 Days) | (N/cm) @ 121 C. (Aged 0 Days) | (Aged 7 Days) |
| 15 | 7 | 4.4 | 17.1* | 6.5 | 0.3 | 1.9 |
| 16 | 8 | 7.2 | 23.2* | 7.5 | 1.0 | 2.5 |

*decorative laminate film tore; peel value is that at failure.

The results in Table 7 show that a peel adhesion strength of at least 4.4 Newtons/centimeter is provided by the adhesive compositions, and that upon aging at 71° C. the peel adhesion strength was generally greater than the strength of the decorative laminate film as evidenced by tearing of the decorative laminate film. In addition, when heated to 121° C. the decorative laminate films and adhesive were cleanly removable, exhibiting peel adhesion values of 2.5 Newtons/ centimeter or less. For those specimens in which the decorative laminate film did not tear, an adhesive failure mode was observed with the adhesive layer remaining on the decorative laminate film.

EXAMPLE 17 AND COMPARATIVE EXAMPLE 3

To evaluate the differences in drying times for an adhesive composition containing a microsphere suspension and one having a latex emulsion comprised of the same components as the microsphere suspension thermogravimetric analysis was used to measure the rate of drying. More specifically, two aqueous blends were prepared. The first, representing an example of the invention, was a blend of Epi-Rez® 5522-WY-55 and a microsphere suspension, prepared as described above in "General Preparation of Aqueous Adhesive Dispersions—Method A", in a wet weight ratio of 50:50 which resulted in a 47% solids blend having a polyepoxide:microsphere dry ratio of 58:42 (w:w). The second, representing a comparative example, was a blend of Epi-Rez® 5522-WY-55 and the latex emulsion of the Comparative Composition in a wet weight ratio of 50:50 which resulted in a 49% solids blend having a polyepoxide:acrylic resin dry ratio of 56:44 (w:w). These were subjected to thermogravimetric analysis as described in the test method "Evaluation of Drying Time". The results are shown in Table 8 below.

TABLE 8

| Ex. No. | % Dry @ t = 0 min. | % Dry @ t = 10 min. | % Dry @ t = 20 min. | % Dry @ t = 30 min. | % Dry @ t = 40 min. | % Dry @ t = 46 min. |
|---|---|---|---|---|---|---|
| 17 | 0.0 | 50.9 | 80.9 | 94.1 | 97.3 | 98.2 |
| CE-3 | 0.0 | 26.5 | 39.3 | 46.4 | 51.3 | 54.0 |

Note:
for t = 0 to 1 minute the temperature was being ramped from 25° C. to 90° C.;
for t = 1 to 46 minutes, the temperature was held at 90° C.

The results in Table 8 show that the microsphere-containing blend dries more rapidly than a blend containing the analogous acrylic latex. For example, after a time of 20 minutes, the microsphere-containing blend is about 80% dry while the comparative latex-containing blend is about 40% dry.

EXAMPLE 18 AND COMPARATIVE EXAMPLE 4

The effect of available reactive sites on the microsphere component was evaluated by using Differential Scanning Calorimetry (DSC) to determine if the presence of such sites resulted in a reaction with the polyepoxide resin Two different 1:1 (w:w) mixtures of Epi-Rez® 3520-WY-55 and a microsphere suspension (40% solids) were prepared. The resulting 47% solids mixtures had a polyepoxide resin:microsphere dry ratio of 58:42 (w:w). The first mixture contained microspheres which had a composition of IOA:AA:PEOA/97:2:1 (w:w:w) (prepared as described previously) and the second mixture contained microspheres which had a composition of IOA:AA/98:2 (w:w) and was prepared in manner similar to that used for the IOA:AA:PEOA/97:2:1 (w:w:w) composition. Each mixture was coated onto a silicone treated release liner using a knife-over-bed coater to give a wet thickness of 0.25 millimeters, and dried at 70° C. for 15 minutes to provide an adhesive film. These were evaluated for reactivity as described in the test method "Evaluation of Effect of Microsphere Reactivity". The results are shown in Table 9 below.

TABLE 9

| Ex. No. | Reactive Microsphere | Exotherm (Onset, ° C.) |
|---|---|---|
| 28 | No | No |
| CE-5 | Yes | Yes (170) |

The data in Table 9 indicate that the presence of a macromer component (PEOA) in the microsphere component results in the absence of a detectable exotherm, indicative of little or no reaction between the microsphere component and the 1,2-epoxide groups of the polyepoxide component.

Other embodiments are within the following claims. For example, the adhesive composition may be provided on a release liner such as by coating and may subsequently be transferred from the release liner to a substrate. The adhesive composition may also be in the form of a tape.

Also, instead of combining the polyepoxide resin, the curing agent and the microspheres prior to coating the adhesive composition onto a substrate, the curing agent may be first applied to the substrate and then a composition that includes the polepoxide resin and microspheres may be coated onto the curing agent. The entire composition may then be cured, e.g., by heating.

The polyepoxide resin, the curing agent for the polyepoxide resin, the microspheres and the relative amounts thereof can be selected such that the cured adhesive composition is cleanly thermally removable from a pre-selected substrate, e.g., a specific one of two substrates.

The adhesive composition has been described as a polyepoxide resin based adhesive composition, however, other thermosettable adhesive compositions are contemplated. Examples of other thermosettable adhesive compositions that may be made cleanly thermally removable at temperatures above their use temperatures by incorporating plurality of microspheres therein include, e.g., polyurethanes, polyesters, structural acrylics, and cyanate esters.

What is claimed is:

1. A thermosettable adhesive composition comprising
   a polyepoxide resin;
   a curing agent; and
   a plurality of polymeric microspheres, said microspheres, said polyepoxide resin, and said curing agent and the relative amounts thereof, being selected such that upon cure said cured composition forms a semi-structural bond to a substrate that is inseparable at use temperature and, when heated to a temperature that is greater than the use temperature, is cleanly removable from said substrate.

2. The composition of claim 1, wherein upon cure said composition exhibits no greater than about 35% retention of initial peel adhesion strength at a temperature greater than the upper use temperature.

3. The composition of claim 1, wherein upon cure said composition exhibits no greater than about 20% retention of initial peel adhesion strength at a temperature greater than the upper use temperature.

4. The composition of claim 1, wherein upon cure said composition exhibits a peel adhesion strength of at least about 3.5 N/cm measured on an abraded phenolic resin impregnated fiberglass substrate at room temperature.

5. The composition of claim 1, wherein upon cure said composition exhibits a peel adhesion strength of at least about 10.5 N/cm measured on an abraded phenolic resin impregnated fiberglass substrate at room temperature.

6. The composition of claim 1, wherein upon cure said composition exhibits a peel adhesion strength of at least about 3.5 N/cm measured on a polycarbonate substrate at room temperature.

7. The composition of claim 1, wherein upon cure said composition exhibits a peel adhesion strength of at least about 10.5 N/cm measured on a polycarbonate substrate at room temperature.

8. The composition of claim 1, wherein upon cure said composition exhibits a peel adhesion strength of at least 3.5 N/cm measured on an abraded phenolic resin impregnated fiberglass substrate at room temperature and no greater than about 35% retention of initial peel adhesion strength at a temperature greater than the upper use temperature.

9. The composition of claim 1, further comprising a flame retardant.

10. The composition of claim 1, further comprising no greater than 20% by weight of a flame retardant.

11. The composition of claim 1, wherein upon cure said composition exhibits no greater than about 35% retention of initial peel adhesion strength at a temperature of greater than about 50° C.

12. The composition of claim 1, wherein upon cure said composition exhibits no greater than about 35% retention of initial peel adhesion strength at a temperature of at least about 15° C. greater than said upper use temperature.

13. The composition of claim 1, wherein the ratio of weight of said polyepoxide resin to weight of said microspheres is between about 70:30 and about 35:65.

14. The composition of claim 1, wherein the composition cures at a temperature between about room temperature and about 200° C.

15. The composition of claim 1, wherein said microspheres comprise tacky microspheres.

16. The composition of claim 1, wherein said microspheres comprise solid microspheres.

17. The composition of claim 1, wherein said microspheres comprise hollow microspheres.

18. The composition of claim 1, wherein said microspheres comprise tack-free microspheres.

19. The composition of claim 1, wherein said microspheres comprise tacky, solid microspheres.

20. The composition of claim 1, wherein said microspheres have an average diameter between about 1 micrometer and about 20 micrometers.

21. The composition of claim 1, wherein said microspheres comprise the reaction product of isooctyl acrylate, acrylic acid and poly(ethylene oxide)acrylate.

22. The composition of claim 1, wherein said composition is dispersed in water.

23. The composition of claim 1, wherein said composition is tack-free prior to cure.

24. The composition of claim 1, wherein said curing agent comprises a heat-activated curing agent.

25. The composition of claim 1, wherein said curing agent comprises a photolytically-activatedcuring agent.

26. The composition of claim 1, wherein said curing agent comprises a blend of an epoxy homopolymerization catalyst and an addition curing agent.

27. The composition of claim 26, wherein said catalyst is selected from the group consisting of tertiary amines, imidazoles, substituted derivatives of imidazoles and combinations thereof.

28. The composition of claim 1, wherein upon cure said composition is capable of forming a semi-structural bond to a phenolic resin impregnated fiberglass substrate.

29. A thermosettable adhesive composition comprising
   between about 35 and about 70 parts by weight of a polyepoxide resin;
   a curing agent; and
   between about 30 and about 65 parts by weight polymeric microspheres, said composition, upon cure, forms a semi-structural bond to a substrate that is inseparable at use temperature and, when heated to a temperature greater than the use temperature, is cleanly removable from said substrate.

30. The composition of claim 29, wherein upon cure said composition exhibits a peel adhesion of at least about 3.5 N/cm measured on a polycarbonate substrate at room temperature, and no greater than about 35% retention of initial peel adhesion strength at a temperature greater than the upper use temperature.

31. A method for making a thermosettable adhesive composition cleanly removable by incorporating a plurality of polymeric microspheres therein, said composition, upon cure, forms a semi-structural bond to a substrate that is inseparable at use temperature and, when heated to a temperature greater than the use temperature, is cleanly removable from said substrate.

32. The method of claim 31, wherein upon cure said composition exhibits no greater than about 20% retention of initial peel adhesion strength at a temperature greater than the upper use temperature.

33. The method of claim 31, wherein upon cure said composition exhibits a peel adhesion strength of at least about 3.5 N/cm measured on an abraded phenolic resin impregnated fiberglass substrate at room temperature and no greater than about 35% retention of initial peel adhesion strength at a temperature greater than the upper use temperature.

* * * * *

UNITED STATES PATENT AND TRADEMARK OFFICE
CERTIFICATE OF CORRECTION

PATENT NO. : 6,288,170 B1
DATED : September 11, 2001
INVENTOR(S) : Waid, Robert D.

It is certified that error appears in the above-identified patent and that said Letters Patent is hereby corrected as shown below:

Column 1,
Line 42, start new paragraph after "composition".

Column 6,
Line 16, delete space between "dihydroxydiphenyl" and "methane".
Line 37, delete "diaminodiphenyethane" and insert in place thereof -- diaminodiphenylmethane --.
Line 39, delete "bnzene" and insert in place thereof -- benzene --.
Line 39, 40, insert -- - -- preceding ") $\alpha$".
Line 51, delete "dipbenyl" and insert in place thereof -- diphenyl --.
Line 52, delete "conmmercially" and insert in place thereof -- commercially --.

Column 7,
Line 18, delete "regardedas" and insert in place thereof -- regarded as --.

Column 8,
Line 7, delete "dipheny' and insert in place thereof -- diphenyl --.
Line 8, delete "diphenyknethane" and insert in place thereof -- diphenylmethane --.
Line 10, insert -- - -- following "4'".
Line 12, delete "nydroxyphenyl" and insert in place thereof -- hydroxyphenyl --.

Column 9,
Line 34, insert -- . -- following "thereof"
Line 62, delete "trimethylaminep-vinyl" and insert in place thereof -- trimethylamine p-vinyl --.

Column 11,
Line 11, delete "alky" and insert in the place thereof -- alkyl --.
Line 17, insert -- , -- preceding "about".
Line 38, delete "Iipophilc" and insert in the place thereof -- lipophilic --.
Line 41, delete "emulsifiersare" and insert in the place thereof -- emulsifiers are --.
Lines 62 and 63, insert -- " -- preceding "Surfactant" and insert -- " -- following "Biology,".

Column 13,
Line 60, delete "compositionsare" and insert in the place thereof -- compositions are --.

Column 14,
Line 3, delete ":" and insert in the place thereof -- . --.

UNITED STATES PATENT AND TRADEMARK OFFICE
CERTIFICATE OF CORRECTION

PATENT NO. : 6,288,170 B1
DATED : September 11, 2001
INVENTOR(S) : Waid, Robert D.

It is certified that error appears in the above-identified patent and that said Letters Patent is hereby corrected as shown below:

Column 17,
Line 42, delete "Calf." and insert in place thereof -- Calif. --.

Column 20,
Line 32, delete "vesse" and insert in the place thereof -- vessel --.
Line 67, Table 1 should be on the following page.

Column 21,
Line 17, delete "$\pm$" and insert in the place thereof -- + --.
Line 49, insert -- @ -- preceding "121$°$".
Line 66, insert -- below. -- following "Table 3".

Column 22,
Line 25, delete "below".

Column 26,
Line 31, insert -- . -- after "resin".

Column 27,
Line 15, insert -- a -- preceding "plurality".

Column 28,
Line 34, delete "activatedcuring" and insert in place thereof -- activated curing --.
Line 62, insert -- comprising a polyepoxide resin and a curing agent which is -- preceding "cleanly".

Signed and Sealed this

Third Day of May, 2005

JON W. DUDAS
*Director of the United States Patent and Trademark Office*